US009663868B2

(12) United States Patent
Matsuda et al.

(10) Patent No.: US 9,663,868 B2
(45) Date of Patent: May 30, 2017

(54) ELECTRO-DEPOSITED COPPER-ALLOY FOIL AND ELECTRO-DEPOSITED COPPER-ALLOY FOIL PROVIDED WITH CARRIER FOIL

(71) Applicant: MITSUI MINING & SMELTING CO., LTD., Tokyo (JP)

(72) Inventors: Mitsuyoshi Matsuda, Ageo (JP); Kazuhiro Yoshikawa, Ageo (JP); Takao Fujimoto, Ageo (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 428 days.

(21) Appl. No.: 13/727,735

(22) Filed: Dec. 27, 2012

(65) Prior Publication Data

US 2013/0171457 A1 Jul. 4, 2013

Related U.S. Application Data

(60) Provisional application No. 61/580,777, filed on Dec. 28, 2011.

(51) Int. Cl.
*B21C 37/00* (2006.01)
*C25D 7/06* (2006.01)
(Continued)

(52) U.S. Cl.
CPC ............ *C25D 7/0614* (2013.01); *B32B 15/20* (2013.01); *C25D 1/04* (2013.01); *C25D 3/58* (2013.01);
(Continued)

(58) Field of Classification Search
USPC ......................................... 428/352, 418, 674
See application file for complete search history.

(56) References Cited

U.S. PATENT DOCUMENTS 3,585,010 A * 6/1971 Luce et al. ..................... 428/608
3,957,594 A * 5/1976 Grellet ...................... C25D 5/50
205/225

(Continued)

FOREIGN PATENT DOCUMENTS

CN 1298458 6/2001
EP 0163419 12/1985
(Continued)

OTHER PUBLICATIONS

International Search Report in counterpart application No. PCT/JP2012/081180, dated Jun. 6, 2013 (published as WO2013/081139A1).

(Continued)

*Primary Examiner* — Humera Sheikh
*Assistant Examiner* — Seth Dumbris
(74) *Attorney, Agent, or Firm* — Greenblum & Bernstein, P.L.C.

(57) ABSTRACT

An object of the present invention is to provide an electro-deposited copper-alloy foil excellent in infrared laser processability which enables uniform etching rate along a thickness direction in following etching process. To achieve the object, an electro-deposited copper-alloy foil obtained from electrolyzing of an electrolytic solution, wherein the electro-deposited copper-alloy foil has tin content of 8% by mass to 25% by mass is employed. In the electro-deposited copper-alloy foil, a grain in a crystal structure is preferably a columnar grain longitudinal along a thickness direction.

11 Claims, 6 Drawing Sheets

(51) Int. Cl.
  *B32B 15/20* (2006.01)
  *C25D 1/04* (2006.01)
  *C25D 3/58* (2006.01)

(52) U.S. Cl.
  CPC ..... *B32B 2260/021* (2013.01); *B32B 2457/08* (2013.01); *Y10T 428/31663* (2015.04); *Y10T 428/31678* (2015.04)

(56) References Cited

U.S. PATENT DOCUMENTS

| | | | | |
|---|---|---|---|---|
| 4,049,481 | A | * | 9/1977 | Morisaki ................ 156/151 |
| 4,522,331 | A | * | 6/1985 | Liebermann ......... B23K 35/302 148/433 |
| 4,579,761 | A | * | 4/1986 | Ruscoe .................. C25D 3/58 205/143 |
| 6,194,056 | B1 | | 2/2001 | Sakai et al. |
| 6,248,401 | B1 | * | 6/2001 | Chiang et al. .............. 427/96.8 |
| 6,652,962 | B1 | * | 11/2003 | Sato et al. .................. 428/352 |
| 7,026,059 | B2 | | 4/2006 | Suzuki et al. |
| 7,175,920 | B2 | | 2/2007 | Suzuki et al. |
| 7,931,988 | B2 | * | 4/2011 | Feng et al. .................. 429/245 |
| 2003/0188974 | A1 | * | 10/2003 | Padhi ....................... C25D 3/58 205/241 |
| 2009/0197109 | A1 | * | 8/2009 | Kawaguchi ............ H05K 3/384 428/606 |

FOREIGN PATENT DOCUMENTS

| | | |
|---|---|---|
| EP | 1079005 A1 | 2/2001 |
| EP | 1 139 704 | 10/2001 |
| EP | 2071057 | 6/2009 |
| JP | 2000-17476 | 1/2000 |
| JP | 2001-68816 | 3/2001 |
| JP | 2001-226796 | 8/2001 |
| JP | 2003-41334 | 2/2003 |
| TW | I276708 | 3/2007 |
| WO | WO97/43466 | 11/1997 |

OTHER PUBLICATIONS

Taiwanese Office Action in counterpart Taiwanese application No. 101144967, dated Mar. 7, 2016 (with partial English-language translation).

Chinese Office Action in counterpart Chinese application No. 201280059089.8, dated Oct. 9, 2015 (with partial English-language translation).

Mao Yao-dong, "Research on High-performance Tin Phosphorus Bronze C5210 Copper," Natural Science Journal of Hefei College, pp. 56-59, vol. 19, Edition 4, published Nov. 15, 2009 (with partial English-language translation).

European Partial Supplementary Search Report in counterpart application No. EP12852896.5, dated Jun. 2, 2015.

* cited by examiner

ELECTRO-DEPOSITED COPPER-ALLOY FOIL AND ELECTRO-DEPOSITED COPPER-ALLOY FOIL PROVIDED WITH CARRIER FOIL

BACKGROUND OF THE INVENTION

Field of the Invention

The present invention relates to an electro-deposited copper-alloy foil. In particular, the present invention relates to an electro-deposited copper-alloy foil suitable for a printed wiring board use.

Description of the Related Art

In recent years, a device space in a printed wiring board used for supplying an electric signal tends to be narrowed depending on high performance and downsizing of electronic and electric devices. The matter requires downsized high-density mounting on the printed wiring board. Then, a micro via-hole has been provided in the printed wiring board suitable for high density mounting to electrically conduct plural layers.

However, even when the formation of the micro via-hole in the printed wiring board should be performed by direct irradiating of a laser beam on copper foil, absorptivity of copper foil in wavelength region of an infrared laser is extremely low and it makes infrared laser working on copper foil difficult. So, the surface of copper foil should be subjected to a treatment which enhances infrared laser absorptivity.

For example, Japanese Patent Laid-Open No. 2001-226796 (hereinafter: Patent Document 1) discloses a technology to provide copper foil for laser-drilling which enables drilling by an infrared laser. Specifically, a surface layer composed of material(s) any one selected from a Sn—Cu alloy mainly composed of Sn and Cu, and metal Sn; or both the Sn—Cu alloy and the metal Sn is formed on an infrared laser radiation side surface of copper foil in copper foil for infrared laser-drilling. Furthermore, Patent Document 1 discloses a rather preferable surface layer than that consisting of just Sn; any one selected from the surface layer consisting of an alloy layer mainly composed of Sn and Cu and a metal Sn layer which is formed by subjecting a metal Sn layer formed on the surface of copper foil to a diffusion treatment to form an alloy layer mainly composed of Sn and Cu, and a surface layer consisting of an alloy layer mainly composed of Sn and Cu. As described above, Patent Document 1 discloses that the surface layer and copper foil can be subjected to infrared laser-drilling all at once when the surface layer is composed of the metal and the alloy having infrared laser absorptivity higher than that of Cu on the infrared laser radiation side surface of copper foil.

Next, Japanese Patent Laid-Open No. 2001-068816 (hereinafter: Patent Document 2) discloses a technology which improves the initial absorption efficiency of an infrared laser beam by subjecting the surface of copper foil to a black-oxide treatment. Patent Document 2 then discloses that the improvement of the initial infrared laser beam absorption efficiency on the surface of copper foil subjected to the black-oxide treatment provides an initial infrared laser-drilling shape which is uniform and flat, and it achieves excellent infrared laser-drilling.

However, in the method disclosed in Patent Document 1 subjecting the metal Sn layer formed on the surface of copper foil to the diffusion treatment to alloy Sn and Cu (that is, form the alloy layer mainly composed of Sn and Cu), composition of the alloy layer in the thickness direction will be uneven. The matter causes deviations in the etching rate along the thickness direction in the following etching process and it makes formation of a desired wiring pattern difficult.

Further, in the conventional methods disclosed in Patent Documents 1 and 2, it is difficult to reduce a manufacturing cost because the surface of copper foil should be subjected to the treatment for enhancing the infrared laser absorptivity, i.e. the methods include indispensable additional steps in a manufacturing process.

Then, an object of the present invention is to provide an electro-deposited copper-alloy foil excellent in infrared laser processability which enables uniform etching rate along a thickness direction in following etching process.

SUMMARY OF THE INVENTION

As the results of the intensive studies, the present inventors have employed the following electro-deposited copper-alloy foil to achieve the object.

[Electro-Deposited Copper-Alloy Foil According to the Present Invention]

An electro-deposited copper-alloy foil according to the present invention is obtained from electrolyzing of an electrolytic solution. The electro-deposited copper-alloy foil has tin content of 8% by mass to 25% by mass.

[Electro-Deposited Copper-Alloy Foil Provided with Carrier Foil According to the Present Invention]

An electro-deposited copper-alloy foil provided with a carrier foil according to the present invention comprises the above-mentioned electro-deposited copper-alloy foil. The electro-deposited copper-alloy foil comprises a layer structure of a carrier foil/a releasing layer/an electro-deposited copper-alloy foil. Further, the electro-deposited copper-alloy foil is characterized in that tin content is 8% by mass to 25% by mass.

[Surface-Treated Electro-Deposited Copper-Alloy Foil According to the Present Invention]

The electro-deposited copper-alloy foil according to the present invention is characterized in that a surface of the above-mentioned electro-deposited copper-alloy foil is subjected to a surface-treatment at least one selected from a roughening treatment, a rust-proofing treatment, and a silane coupling agent treatment.

[Surface-Treated Electro-Deposited Copper-Alloy Foil Provided with a Carrier Foil According to the Present Invention]

The electro-deposited copper-alloy foil provided with a carrier foil according to the present invention is characterized in that a surface of the electro-deposited copper-alloy foil constituting the electro-deposited copper-alloy foil provided with a carrier foil is subjected to a surface-treatment at least one selected from the roughening treatment, the rust-proofing treatment, and the silane coupling agent treatment.

[Metal-Clad Laminate According to the Present Invention]

A metal-clad laminate according to the present invention is obtained from laminating of the surface-treated electro-deposited copper-alloy foil to a material constituting the insulating layer.

Further, the metal-clad laminate according to the present invention is obtained from laminating of the surface-treated electro-deposited copper-alloy foil provided with a carrier foil to the material constituting the insulating layer and then the carrier foil is removed.

Because the electro-deposited copper-alloy foil according to the present invention is composed of copper-tin alloy containing tin at the above-mentioned contents, the electro-deposited copper-alloy foil is excellent in infrared laser-drilling workability, and can be etched at a uniform speed along the thickness direction of the electro-deposited copper-alloy foil. The electro-deposited copper-alloy foil according to the present invention can achieve excellent infrared laser-drilling workability equal to or more than that of an electro-deposited copper foil subjected to a treatment which enhances infrared laser absorptivity efficiency without performing a post-treatment for enhancing infrared laser absorptivity efficiency such as a black-oxide treatment.

The surface-treated electro-deposited copper-alloy foil according to the present invention is manufactured by subjecting to the surface treatment including the rust-proofing treatment, the roughening treatment for improving adhesion of the electro-deposited copper-alloy foil to a base material resin and the silane coupling agent treatment. So, the surface-treated electro-deposited copper-alloy foil is excellent in laser-drilling workability also.

When the electro-deposited copper-alloy foil according to the present invention is used as an ultrathin electro-deposited copper-alloy foil having a thickness of 7 μm or less, the electro-deposited copper-alloy foil can be in the form of the electro-deposited copper-alloy foil provided with a carrier foil.

DETAILED DESCRIPTION OF THE PREFERRED EMBODIMENTS

Hereinafter, preferred embodiments of an electro-deposited copper-alloy foil, an electro-deposited copper-alloy foil provided with a carrier foil, and a surface-treated electro-deposited copper-alloy foil according to the present invention will be described one by one.

[Embodiment of Electro-Deposited Copper-Alloy Foil]

The electro-deposited copper-alloy foil according to the present invention is obtained from electrolyzing of an electrolytic solution. The electro-deposited copper-alloy foil is characterized in that tin content is 8% by mass to 25% by mass.

Figure 1:
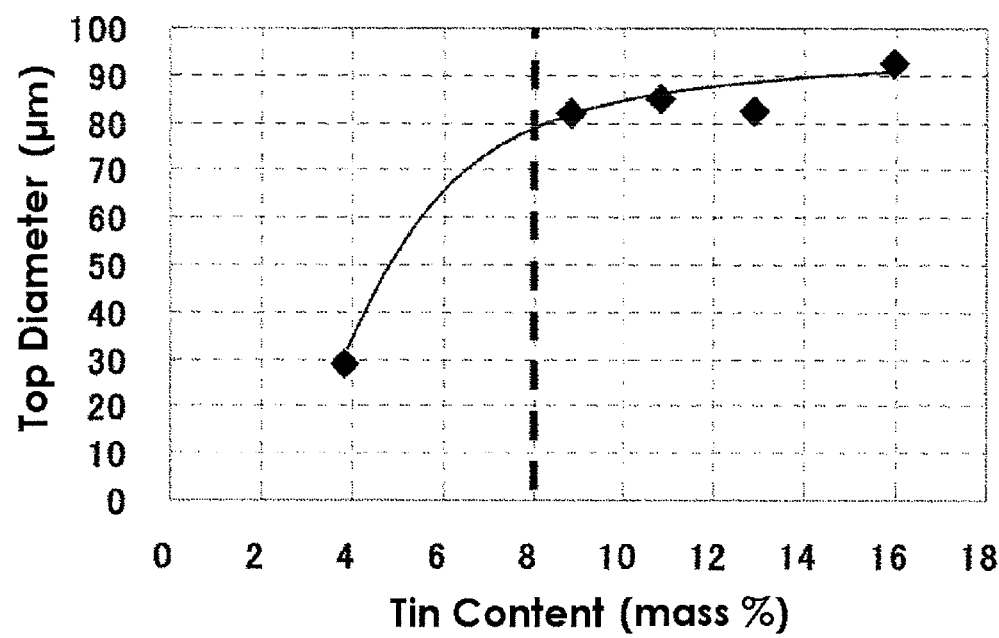
FIG. 1 is a diagram showing a relationship between tin content of an electro-deposited copper-alloy foil according to the present invention and a top diameter of a hole formed in the electro-deposited copper-alloy foil by infrared laser-drilling.

It is apparent from infrared laser-drilling workability and an etching rate of the electro-deposited copper-alloy foil which will be described later that tin content in the electro-deposited copper-alloy foil is preferable to be in the above-mentioned range. FIG. 1 shows the infrared laser-drilling workability of the electro-deposited copper-alloy foil having a thickness of 3 μm prepared with changed tin contents. The FIG. 1 is obtained when pulse energy having working energy of 6.9 m-Joule is employed, and the electro-deposited copper-alloy foil was infrared laser-drilled at a pulse width of 16 μsec and a beam diameter of 120 μm. The infrared laser-drilling condition is employed as a condition where a hole having a top diameter of 80 μm can be formed when an infrared laser radiation surface of an electro-deposited copper foil having a thickness of 3 μm is black-oxide treated. The top diameter here is an opening diameter of a hole at an infrared laser radiation side surface.

As apparent in FIG. 1, the electro-deposited copper-alloy foil having tin content of less than 8% by mass is not preferable because the infrared laser-drilling workability is poor than that of the electro-deposited copper foil having the laser radiation surface subjected to the black-oxide treatment. On the other hand, it is apparent that the electro-deposited copper-alloy foil having tin content of 8% mass or more has high infrared laser absorptivity to provide drilling processability equal to or more than that of the electro-deposited copper foil having the infrared laser radiation surface subjected to the black-oxide treatment. So, the electro-deposited copper-alloy foil having tin content of 8% by mass or more is the electro-deposited copper-alloy foil which enables formation of a hole having a top diameter of 80 μm as a target.

Figure 2:
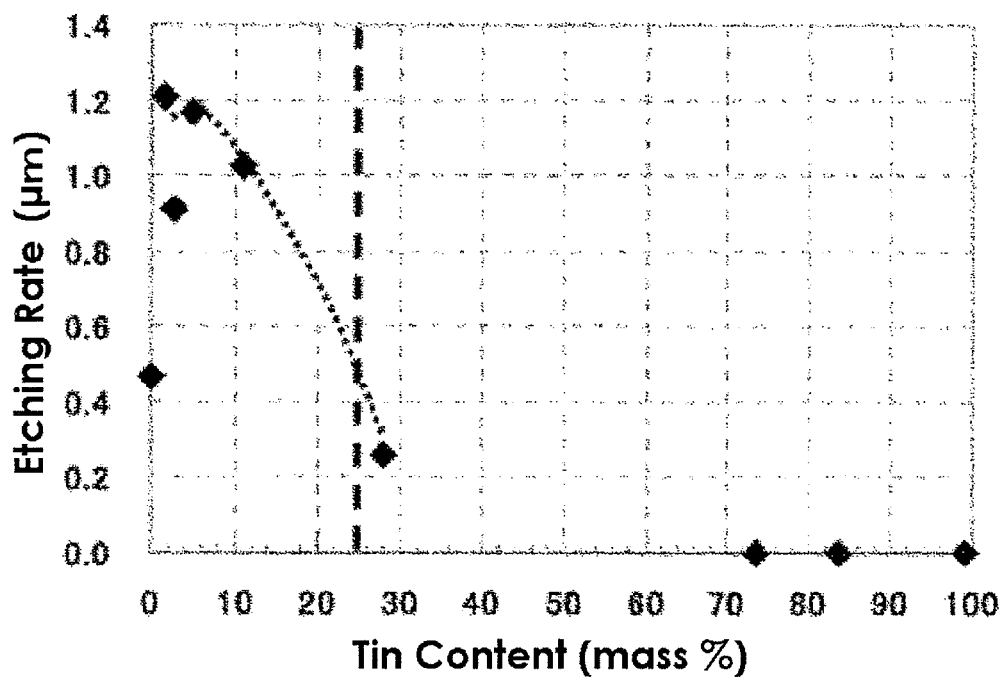
FIG. 2 is a diagram showing a relationship between tin content of the electro-deposited copper-alloy foil according to the present invention and an etching rate.

On the other hand, when tin content exceeds 25% by mass, it is not preferable because an etching rate of the electro-deposited copper-alloy foil is slower than that of a conventional electro-deposited copper foil. FIG. 2 shows a relationship between tin content of the electro-deposited copper-alloy foil and the etching rate. The etching rate in FIG. 2 is obtained as described below. Electro-deposited copper-alloy foils having different tin contents are prepared. Each of the electro-deposited copper-alloy foils is immersed in a sulfuric acid-hydrogen peroxide based etching solution for 30 seconds, followed by rinsing and drying. Then, the thickness was measured from cross-sectional image of the electro-deposited copper-alloy foil. The thickness reduction obtained from the thickness decreased by etching is converted into the etching rate of the electro-deposited copper-alloy foil.

As is apparent in FIG. 2, the etching rate of the electro-deposited copper-alloy foil with slight tin content is faster than that of the electro-deposited copper foil in which tin content is 0% by mass. Further, the etching rate of the electro-deposited copper-alloy foil is the fastest when tin content is about 2% by mass. Then, the etching rate is reduced with the increase of tin content. Next, it is apparent that when tin content exceeds 25% by mass, the etching rate is reduced to less than that of the conventional electro-deposited copper foil composed of just copper component.

The reduction of the etching rate is not preferable because the matter greatly affect on the manufacturing efficiency of a printed wiring board and causes deviation in an etched state along the thickness direction of the electro-deposited copper-alloy foil. Specifically, when a desired wiring pattern is intended to be formed using the electro-deposited copper-alloy foil, formation of the wiring pattern excellent in etching factor will be made hard because of reduced etching rate. It means that as tin content in the electro-deposited copper-alloy foil according to the present invention is 25% by mass or less, an etching rate is faster than that of the conventional electro-deposited copper foil composed of just copper component, and the wiring pattern excellent in etching factor can be manufactured.

As described above, tin content of 8% by mass to 25% by mass in the electro-deposited copper-alloy foil makes infrared laser-drilling workability excellent and enables formation of the wiring pattern excellent in etching factor in the following etching process.

In the electro-deposited copper-alloy foil according to the present invention, a grain in a crystal structure is preferable to be a columnar grain longitudinal along a thickness direction. The electro-deposited copper-alloy foil comprising such columnar grain in which the grain in the crystal structure is longitudinal along the thickness direction is excellent in the infrared laser-drilling workability. That is, because the extending direction of a hole formed by infrared laser radiation along the electro-deposited copper-alloy foil thickness direction almost corresponds to the longitudinal direction of the columnar grain, a hole having a less bumpy inner wall surface can be formed by the infrared laser-drilling.

Further, a grain boundary dissolves prior to in the etching process as the general property of a metal material. For this reason, in the electro-deposited copper-alloy foil having the columnar grain in which the grains in the crystal structure being long in the thickness direction as described above, the surface of the electro-deposited copper-alloy foil where etching starts is high in grain boundary density and the matter may makes an initial etching rate fast. Moreover, etching will smoothly proceed in the thickness direction and as a result, the etching rate increases also.

As for the thickness of the electro-deposited copper-alloy foil described above, it is not particularly limited. When a popular product manufactured is considered, thickness may be 0.5 μm to 18 μm. However, when the electro-deposited copper-alloy foil is used for the infrared laser-drilling, thickness of the electro-deposited copper-alloy foil is preferable to be thinner; more preferable thickness is 0.5 μm to 7 μm. When the electro-deposited copper-alloy foil according to the present invention is used as an ultrathin foil having a thickness of 7 μm or less, the electro-deposited copper-alloy foil is preferably used as an electro-deposited copper-alloy foil provided with a carrier foil described later not to generate defects including wrinkles and tears in handling.

[Embodiment of Electro-Deposited Copper-Alloy Foil Provided with Carrier Foil]

The electro-deposited copper-alloy foil provided with a carrier foil according to the present invention comprises the above-mentioned electro-deposited copper-alloy foil and characterized in having a layer structure of a carrier foil/a releasing layer/an electro-deposited copper-alloy foil. The carrier foil is provided to support the handling ability of a thin electro-deposited copper-alloy foil having a poor mechanical strength because of being thin. The material for the carrier foil is not particularly limited as long as the carrier foil is electric conductive so that the electro-deposited copper-alloy foil can be formed on the releasing layer by electrolysis after forming of the releasing layer on the surface of the carrier foil. Although the carrier foil may include an aluminum foil, copper foil, and a resin film having a metal-coated surface, copper foil is preferable to be used because copper foil is easy in collection and recycle after releasing the carrier foil. The thickness of copper foil used as the carrier foil is not particularly limited, but copper foil having a thickness of 12 μm to 100 μm has been used.

The releasing layer is indispensable for a peelable type electro-deposited copper-alloy foil provided with carrier foil in which the carrier foil should be released by peeling. As for the releasing layer, any of an inorganic releasing layer ("inorganic material" here includes chromium, nickel, molybdenum, tantalum, vanadium, tungsten, cobalt, and their oxides), and an organic releasing layer may be employed. When the organic releasing layer is employed, one or mixture of organic agents selected from a nitrogen-containing organic compound, a sulfur-containing organic compound, and carboxylic acid is preferable to be used. Among these, it is preferable to employ the organic releasing layer formed by using 1,2,3-benzotriazole, carboxybenzotriazole (hereinafter, referred to as "CBTA"), N',N'-bis(benzotriazolylmethyl)urea, 1H-1,2,4-triazole, and 3-amino-1H-1,2,4-triazole which are triazole compounds having a substituent group because an releasing operation of the carrier foil is easy.

In the electro-deposited copper-alloy foil provided with a carrier foil according to the present invention, it is preferable to further have a heat-resistant metal layer formed between the carrier foil and the releasing layer or between the releasing layer and the electro-deposited copper-alloy foil to have the layer structures of a carrier foil/a heat-resistant metal layer/a releasing layer/an electro-deposited copper-alloy foil; or a carrier foil/a releasing layer/a heat-resistant metal layer/an electro-deposited copper-alloy foil.

[Embodiment of Applicable Surface Treatment]

In the surface-treated electro-deposited copper-alloy foil according to the present invention is characterized in that the surface of the electro-deposited copper-alloy foil is subjected to a surface-treatment at least one selected from a roughening treatment, a rust-proofing treatment, and a silane coupling agent treatment. The surface treatment is subjected in consideration of requirements depending on applications and includes the roughening treatment, the rust-proofing treatment, and the silane coupling agent treatment provided on the bonding surface of the electro-deposited copper-alloy foil that enhance performances including adhesion, chemical resistance and heat resistance.

The roughening treatment physically improves adhesion of the surface-treated electro-deposited copper-alloy foil to a material constituting the insulating layer and is provided on one surface or both surfaces of the electro-deposited copper-alloy foil. More specifically, methods applicable include attaching of fine metal particles and forming of a rough surface by an etching method on the surface of the electro-deposited copper-alloy foil. When fine metal particles are attached on the surface of the electro-deposited copper-alloy foil, a popular method in which a burning plating process for depositing the fine metal particles on the surface followed by a seal plating process for preventing dropping off of the fine metal particles is employed.

Next, the rust-proofing treatment will be described. The rust-proofing treatment is performed to achieve the long-term shelf life of the surface-treated electro-deposited copper-alloy foil and the surface-treated electro-deposited copper-alloy foil provided with a carrier foil, and to prevent oxidation caused by heat loading in a hot-press lamination for manufacturing of a metal-clad laminate using the surface-treated electro-deposited copper-alloy foil. Further, adhesion of the surface-treated electro-deposited copper-alloy foil provided with the rust-proofing treatment to the material constituting the insulating layer will be improved. In the rust-proofing treatment, an organic rust-proofing components including triazole and benzotriazole, a metal-based rust-proofing component including zinc, a zinc alloy, nickel, a nickel alloy, chromium, and a chromium alloy, and inorganic rust-proofing components including oxide-based rust-proofing components for a chromate treatment can be used. As any rust-proofing component may be employed without problem, the rust-proofing treatment most suitable for the purpose of use may be selected.

The silane coupling agent treatment is the surface-treatment chemically improves adhesion of the electro-deposited copper-alloy foil after finishing the roughening treatment and/or the rust-proofing treatment to the material constituting the insulating layer. A silane coupling agent used in the silane coupling agent treatment is not particularly limited. A silane coupling agent can be optionally selected from the silane coupling agents including an epoxy-based silane coupling agent, an amino-based silane coupling agent, and a mercapto-based silane coupling agent in consideration of the properties of the material constituting the insulating layer used and a plating bath used in a printed wiring board manufacturing process. Methods including immersion, coating, showering, and electrodeposition can be employed using a solution containing the silane coupling agent to form a silane coupling agent treated layer.

When the adhesion of the surface-treated electro-deposited copper-alloy foil to the material constituting the insulating layer is considered, a primer resin layer is preferably provided on the surface of the surface-treated electro-deposited copper-alloy foil. The primer resin layer is the material excellent in adhesion to both the surface-treated electro-deposited copper-alloy foil and the material constituting the insulating layer which assures excellent adhesion of the surface-treated electro-deposited copper-alloy foil to the material constituting the insulating layer. The primer resin layer is not particularly limited as long as the primer resin layer achieves the effect. For example, the primer resin layer is preferable to be composed of a resin composition containing an epoxy resin and an aromatic polyamide resin polymer.

The surface of the electro-deposited copper-alloy foil constituting the electro-deposited copper-alloy foil provided with a carrier foil can be surface treated by the same method described above also. When the surface of the electro-deposited copper-alloy foil constituting the electro-deposited copper-alloy foil provided with a carrier foil is surface treated, the bonding surface to a material constituting the insulating layer of the electro-deposited copper-alloy foil constituting the electro-deposited copper-alloy foil provided with a carrier foil is surface treated. Further, the back surface (an opposite surface of the carrier foil where the releasing layer is not provided) of the carrier foil constituting electro-deposited copper-alloy foil provided with the carrier foil can be surface treated by the same methods also.

A manufacturing method of the electro-deposited copper-alloy foil is not particularly limited as long as the electro-deposited copper-alloy foil having tin content of 8% by mass to 25% by mass is obtained by peeling off copper-alloy film in a predetermined thickness electrolytically deposited on the surface of a negative electrode such as a titanium plate and a titanium drum by using an electrolytic solution containing copper ions and tin ions as supply sources of copper and tin contained in the electro-deposited copper-alloy foil. Also, a manufacturing condition of the electro-deposited copper-alloy foil provided with a carrier foil according to the present invention is not particularly limited as long as the electro-deposited copper-alloy film having tin content of 8% by mass to 25% by mass is electrolytically deposited on the surface of the releasing layer provided on the surface of the carrier foil by polarizing the carrier foil as a negative electrode by using an electrolytic solution containing copper ions and tin ions as supply sources of copper and tin contained in the electro-deposited copper-alloy foil.

Hereinafter, the present invention will be more specifically described with reference to Examples. However, the present invention is not limited to the Examples.

Example 1

In Example 1, a surface-treated electro-deposited copper-alloy foil provided with a carrier foil was prepared by a method described below. Then a metal-clad laminate was prepared and infrared laser-drilling workability was evaluated by using the metal-clad laminate. Hereinafter, process steps in Example 1 will be described one by one.

[Preparation of Surface-Treated Electro-Deposited Copper-Alloy Foil Provided with Carrier Foil]

The surface-treated electro-deposited copper-alloy foil provided with a carrier foil prepared in Example 1 was prepared through the following steps 1 to 4. Respective steps will be described.

Step 1: In the step 1, an electro-deposited copper foil having a thickness of 18 μm was used as a carrier foil, and a releasing layer was formed on one surface having surface roughness (Rzjis) of 0.6 μm. The surface roughness was measured by a probe type surface roughness measuring meter according to JIS B 0601 using a diamond stylus of which tip radius is 2 μm.

The carrier foil provided with the releasing layer was prepared in the following manner. The carrier foil was immersed in a CBTA-containing dilute sulfuric acid aqueous solution having sulfuric acid concentration of 150 g/l, copper concentration of 10 g/l, a CBTA concentration of 800 ppm at a solution temperature of 30° C. for 30 seconds for pickling a pollution component put on the electro-deposited copper foil and adsorbing CBTA on the surface of the carrier foil.

Step 2: In the step 2, the carrier foil provided with the heat-resistant metal layer and the releasing layer was prepared by cathode-polarizing the carrier foil provided with the releasing layer in a metal component-containing electrolytic solution to form a heat-resistant metal layer on the surface of the releasing layer. Specifically, the carrier foil provided with the heat-resistant metal layer and the releasing layer was prepared by using a Watts bath having 330 g/l of nickel sulfate ($NiSO_4.6H_2O$), 45 g/l of nickel chloride ($NiCl_2.6H_2O$), boric acid of 30 g/l, and pH 3 as a nickel electrolytic solution; and electrolyzed at a solution temperature of 45° C. and cathode current density of 0.4 A/dm$^2$ to form a nickel layer having thickness of 0.01 micron-meter on the surface of the releasing layer.

Step 3: In the step 3, the electro-deposited copper-alloy foil provided with the carrier foil was prepared by cathode-polarizing the carrier foil provided with the releasing layer and the heat-resistant metal layer in copper-tin plating bath to form the electro-deposited copper-alloy foil on the surface of the heat-resistant metal layer. The peelable type electro-deposited copper-alloy foil provided with the carrier foil was prepared by electrolyzing copper-tin plating bath having the following composition under the following condition to form the electro-deposited copper-alloy foil having a thickness of 3 μm.

[Composition of Copper-Tin Plating Bath and Electrolysis Condition]

$CuSO_4.5H_2O$: 157 g/l (Cu: 40 g/L)
$SnSO_4$: 127 g/l (Sn: 70 g/L)
$C_6H_{11}O_7Na$: 70 g/l
$H_2SO_4$: 70 g/l
Solution temperature: 45° C.
Cathode current density: 30 A/dm$^2$ Step 4: In the step 4, the surface of the electro-deposited copper-alloy foil constituting the electro-deposited copper-alloy foil provided with the carrier foil prepared in the step 3 was subjected to a surface treatment. A surface-treated electro-deposited copper-alloy foil provided with the carrier foil was prepared by performing a surface-treatment in which zinc-nickel alloy rust-proofing layer was formed without roughening treatment followed by electrolytic chromate treatment and amino-based silane coupling agent treatment.

Figure 3:
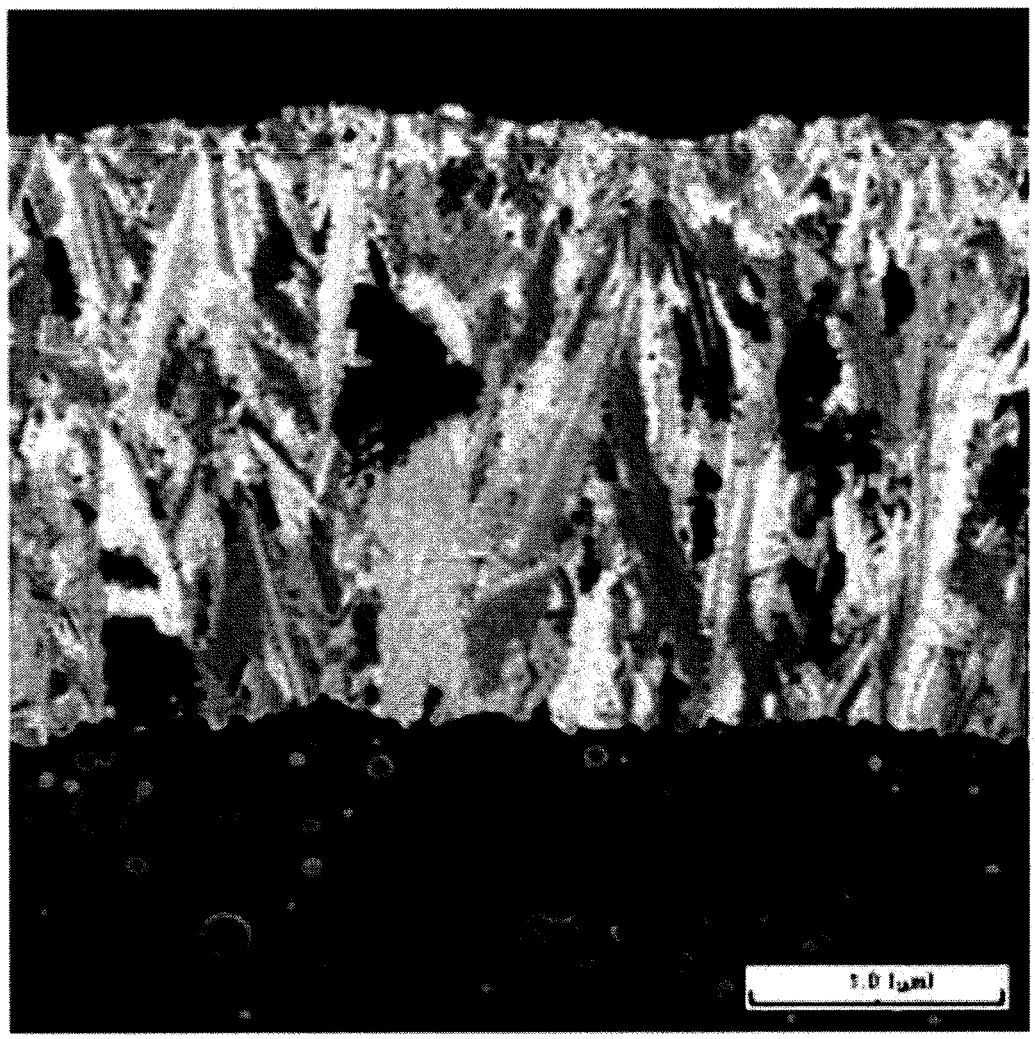
FIG. 3 is a cross-sectional FIB-SIM image of an electro-deposited copper-alloy foil according to Example 1 showing a crystal structure.

Tin content in the surface-treated electro-deposited copper-alloy foil constituting the surface-treated electro-deposited copper-alloy foil provided with the carrier foil was 16.0% by mass. FIG. 3 shows an image of a cross-sectional crystal structure of the surface-treated electro-deposited copper-alloy foil cut in parallel to a crystal growth direction (thickness direction) using a focused ion beam scanning ion microscope (FIB-SIM). As is apparent in FIG. 3, the grain in the crystal structure is a columnar grain longitudinal along the thickness direction in the prepared surface-treated electro-deposited copper-alloy foil. The observation by the FIB-SIM in the present invention was carried out on the metal-clad laminate.

[Preparation of Metal-Clad Laminate]

By using the surface-treated electro-deposited copper-alloy foil provided with the carrier foil, FR-4 pre-preg having a thickness of 100 μm as a material constituting the insulating layer was bonded to the surface of the surface-treated electro-deposited copper-alloy foil by hot pressing. The metal-clad laminate was obtained by peeling off the carrier foil constituting the surface-treated electro-deposited copper-alloy foil provided with the carrier foil.

[Evaluation of Infrared Laser-Drilling Performance]

A carbon dioxide laser was used to evaluate infrared laser-drilling performance. Drilling using the carbon dioxide laser was carried out under conditions of a working energy of 6.9 m-Joule, a pulse width of 16 μsec, and a beam diameter of 120 μm. As a result, a top diameter of a hole formed by infrared laser-drilling was 92.1 μm.

[Evaluation on Etching Property]

Next, the evaluation result on the etching property of the prepared surface-treated electro-deposited copper-alloy foil will be described. The etching property was evaluated using a specimen in which copper layer having a thickness of 20 μm was plated on the surface of the surface-treated electro-deposited copper-alloy foil constituting the above-mentioned metal-clad laminate.

Figure 4:
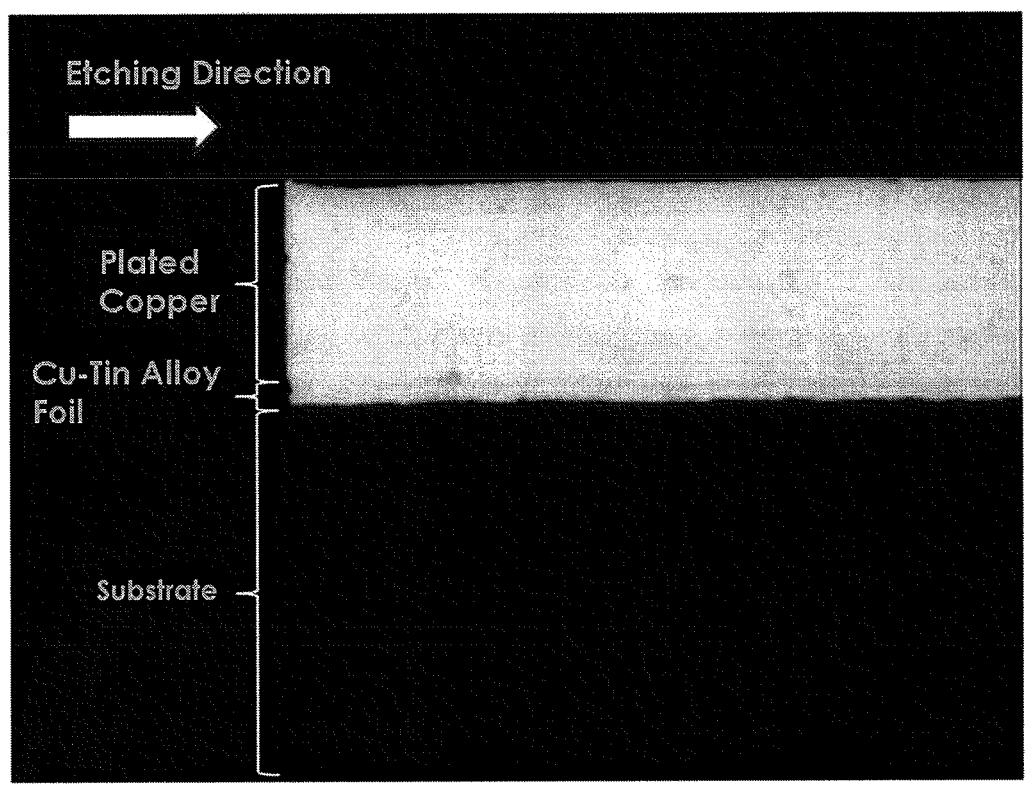
FIG. 4 is a cross-sectional view showing an edge shape of the electro-deposited copper-alloy foil prepared in Example 1 when the electro-deposited copper-alloy foil is etched.

The specimen subjected to copper plating was immersed in a sulfuric acid-hydrogen peroxide based etching solution (CPE800 manufactured by Mitsubishi Gas Chemical Co., Inc.) at a solution temperature of 30° C. for 120 seconds followed by rinsing and drying. The etched surface of the dried specimen is shown in FIG. 4. In FIG. 4, the arrow shows etching direction of the specimen.

Example 2

In Example 2, a surface-treated electro-deposited copper-alloy foil having a thickness of 3 μm was formed with the condition described below where composition of copper-tin plating bath and electrolysis condition in the step 3 in Example 1 were changed. Then, a peelable-type surface-treated electro-deposited copper-alloy foil provided with a carrier foil was prepared in the same manner as in Example 1.

[Composition of Copper-Tin Plating Bath and Electrolysis Condition]

Figure 5:
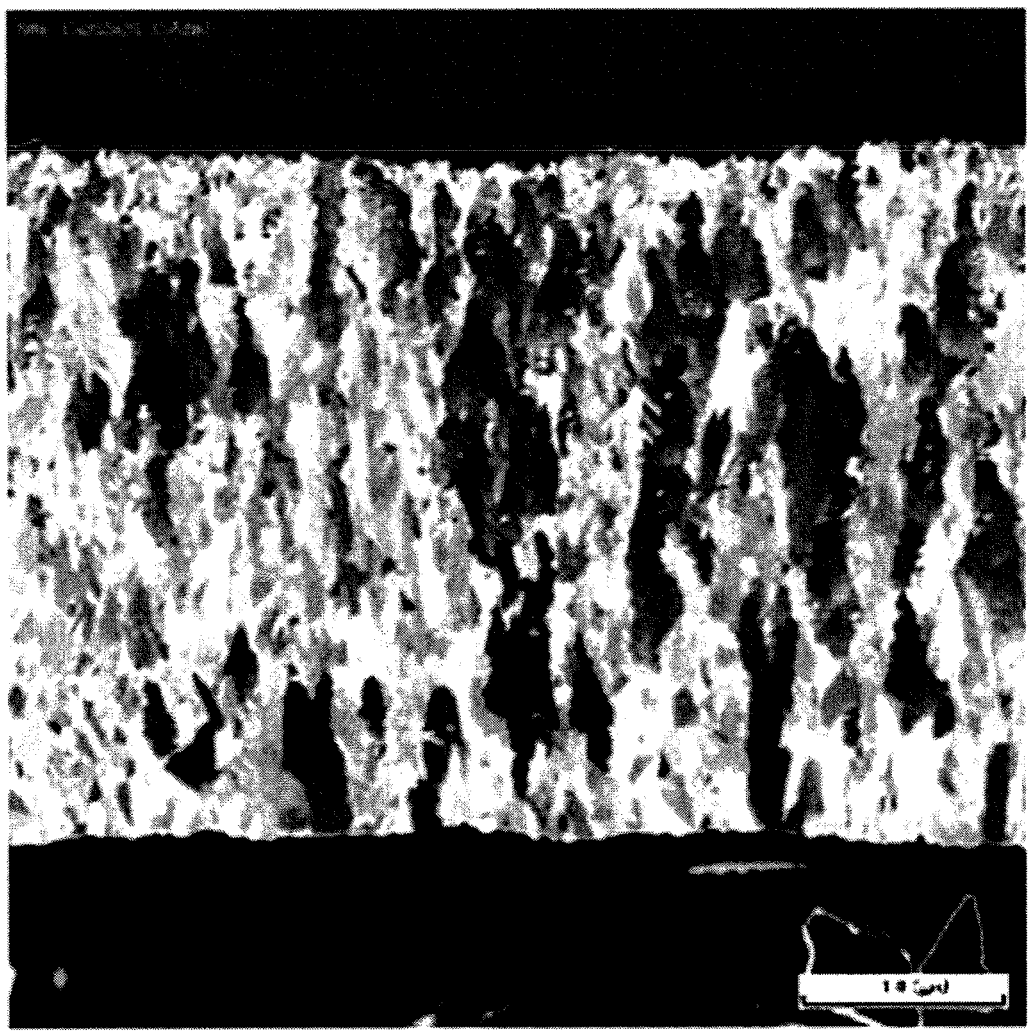
FIG. 5 is a cross-sectional FIB-SIM image of an electro-deposited copper-alloy foil according to Example 2 showing a crystal structure.

$CuSO_4.5H_2O$: 79 g/l (Cu: 20 g/L)
$SnSO_4$: 72 g/l (Sn: 40 g/L)
$C_6H_{11}O_7Na$: 70 g/l
$H_2SO_4$: 70 g/l
Solution temperature: 45° C.
Cathode current density: 15 A/dm$^2$ Tin content of the surface-treated electro-deposited copper-alloy foil constituting the surface-treated electro-deposited copper-alloy foil provided with the carrier foil was 12.9% by mass. FIG. 5 shows an image of a cross-sectional crystal structure of the surface-treated electro-deposited copper-alloy foil cut in parallel to a crystal growth direction (thickness direction) using a focused ion beam scanning ion microscope (FIB-SIM). As is apparent in FIG. 5, the grain in the crystal structure is a columnar grain longitudinal along the thickness direction in the prepared surface-treated electro-deposited copper-alloy foil.

Then, a metal-clad laminate was prepared by the same method as that of Example 1 using the prepared surface-treated electro-deposited copper-alloy foil provided with the carrier foil. Then, infrared laser-drilling performance was evaluated in the same manner as in Example 1. As a result, the average top diameter of the formed hole was 82.5 μm.

COMPARATIVE EXAMPLES

Comparative Example 1

In Comparative Example 1, a surface-treated electro-deposited copper foil provided with a carrier foil was prepared in the same manner as in step 3 of Example 1 except that the production condition of the electro-deposited copper-alloy foil prepared in step 3 of Example 1 was changed into the following condition. That is, a popular surface-treated electro-deposited copper foil was prepared in Comparative Example 1 in place of the surface-treated electro-deposited copper-alloy foil prepared in Example 1. In Comparative Example 1, a surface-treated electro-deposited copper foil provided with a carrier foil was prepared in the manner where an electro-deposited copper foil having a thickness of 3 μm was formed in the step 3 of Example 1 where composition of copper plating bath and electrolysis condition described below were employed.

[Composition of Copper Plating Bath and Electrolysis Condition]

$CuSO_4.5H_2O$: 255 g/l
$H_2SO_4$: 70 g/l
Solution temperature: 45° C.
Cathode current density: 30 A/dm$^2$ A metal-clad laminate was prepared by the same method as that in Example 1 using the prepared surface-treated electro-deposited copper foil provided with a carrier foil. Then, infrared laser-drilling performance was evaluated in the same manner as in Example 1. As a result, a hole could not be formed in the metal-clad laminate. So, it was confirmed that the metal-clad laminate prepared by using the surface-treated electro-deposited copper foil provided with the carrier foil prepared in Comparative Example 1 cannot be drilled under a laser radiation condition adopted in Example 1 when the surface of copper foil is not subjected to a treatment for improving the absorption efficiency of a infrared laser beam on the metal-clad laminate.

Comparative Example 2

Figure 6:
FIG. 6 is a cross-sectional FIB-SIM image of an electro-deposited copper foil according to Comparative Example 2 showing a crystal structure.

Next, in Comparative Example 2, a metal-clad laminate was prepared by the same method as that of Example 1 using the surface-treated electro-deposited copper foil provided with the carrier foil prepared in Comparative Example 1. Then, a metal tin layer having a thickness of 0.4 μm was formed on the surface of the electro-deposited copper foil constituting the metal-clad laminate by using a commercially available electroless tin plating solution. The metal-clad laminate on which the metal tin layer was provided was subjected to a heat treatment at 200° C. for 30 minutes to cause counter diffusion between copper component in the electro-deposited copper foil and tin component in the metal tin layer, thereby a metal-clad laminate comprising an diffusion alloy layer mainly composed of tin-copper on the electro-deposited copper foil was prepared. FIG. 6 shows the image of a cross-sectional crystal structure of the surface-treated electro-deposited copper foil cut in parallel to a crystal growth direction (thickness direction) using a focused ion beam scanning ion microscope (FIB-SIM) using the same device and method in Example 1.

Infrared laser-drilling performance was evaluated in the same manner as in Example 1 using the metal-clad laminate comprising the diffusion alloy layer mainly composed of tin-copper. As a result, the top diameter of the formed hole was 99.5 μm.

Figure 7:
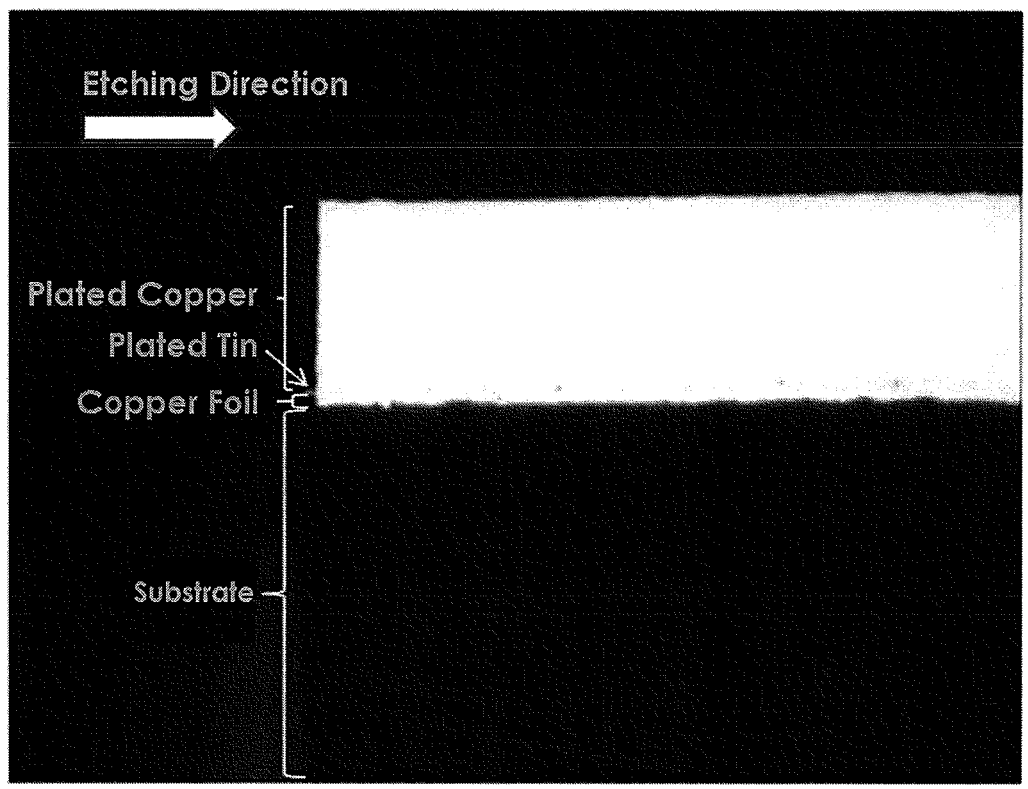
FIG. 7 is a cross-sectional view showing an edge shape of the electro-deposited copper foil prepared in Comparative Example 2 when the electro-deposited copper foil is etched.

The etching property of the electro-deposited copper foil provided with the diffusion alloy layer was evaluated by the same method as that of Example 1. FIG. 7 shows an etched surface of the electro-deposited copper foil provided with the diffusion alloy layer. In FIG. 7, the arrow shows etching direction of the specimen.

Reference Example

In Reference Example, a black-oxide treatment was performed on the surface of the surface-treated electro-deposited copper foil constituting the metal-clad laminate prepared using the surface-treated electro-deposited copper foil provided with the carrier foil prepared in Comparative Example 1. The black-oxide treatment was performed using PROBOND80 manufactured by Rohm and Haas Electronic Materials Company at a solution temperature of 85° C. for 10 minutes.

Infrared laser-drilling performance was evaluated in the same manner as in Example 1 using the metal-clad laminate provided with the black-oxide treatment. As a result, the top diameter of the formed hole was 82.9 μm.

<Comparison Among Examples and Comparative Examples>

Infrared laser-drilling performance: Examples are compared with Comparative Examples in view of the infrared laser-drilling performance. In the surface-treated electro-deposited copper-alloy foils prepared in Examples 1 and 2, the hole satisfying the top diameter of 80 μm can be formed under the pulse width of 16 μsec. So, it is apparent that the infrared laser-drilling performance in each of the surface-treated electro-deposited copper-alloy foils prepared in Examples 1 and 2 is equal to or more excellent than that of the surface-treated electro-deposited copper foil performed the black-oxide treatment prepared in Reference Example. When the matter that the black-oxide treatment is performed on the surface of copper foil constituting copper clad laminate to assure the carbon-dioxide laser-drilling in the actual manufacturing process of the printed wiring board as in the "surface-treated electro-deposited copper foil provided with a black-oxide treatment" prepared in Reference Example is considered, it is apparent that the surface-treated electro-deposited copper-alloy foils prepared in Examples 1 and 2 can assure carbon-dioxide laser-drilling in practical use, i.e. no problem may generates in a practical use.

In contrast, the surface-treated electro-deposited copper foil prepared in Comparative Example 1 could not succeed drilling as described above. Next in Comparative Example 2, in view just from that the top diameter of the hole formed by (carbon-dioxide) laser-drilling is 99.5 μm, the infrared laser-drilling performance may be equal to or more excellent than the surface-treated electro-deposited copper foil provided with the black-oxide treatment as same in the surface-treated electro-deposited copper-alloy foils prepared in Examples 1 and 2. However, tin layer exists at the outer layer which receives irradiation of the infrared laser beam in Comparative Example 2. So, when tin layer having a low melting point exists in the outer surface receives the infrared laser beam, a splash phenomenon will generate in high possibility. When the splash phenomenon generates, droplets scattered by the irradiation of the infrared laser beam will put on the circumference of the opening of the hole as protrusions. As a result, when copper plating layer is provided in a via-hole formation, the disadvantages including abnormal deposition in the plated layer will generate at the protrusions.

Study on the Crystal Structure: First, with reference to FIGS. 3, 5, and 6, difference among the cross-sectional structures in each of the surface-treated electro-deposited copper-alloy foils prepared in Examples 1 and 2 and the surface-treated electro-deposited copper foil provided with the diffusion alloy layer prepared in Comparative Example 2 will be described. A uniform alloy construction is observed along the thickness direction of the foil in the cross-sectional structure in each of the surface-treated electro-deposited copper-alloy foils prepared in Examples as shown in FIGS. 3 and 5. So, as the foils have the uniform construction along the thickness direction, etching rate may not change from the start of etching till the end, and setting of an etching condition is made easy, i.e. it is suitable for formation of a fine pitch circuit.

In contrast, in the surface-treated electro-deposited copper foil provided with the diffusion alloy layer prepared in Comparative Example 2 shown in FIG. 6, it is apparent that the metal tin layer which is not consumed in the counter diffusion remains on the outer surface and the diffusion alloy layer (copper-tin alloy layer) exists between the metal tin layer and copper foil. Strictly speaking, the surface-treated electro-deposited copper foil provided with the diffusion alloy layer prepared in Comparative Example 2 has a three-layer structure of tin layer/copper-tin alloy layer/copper foil. When the common copper etching solution is used, the etching rates of the "tin layer", the "copper-tin alloy layer" and the "copper foil layer" are different from each other. Particularly, it is difficult to dissolve tin layer provided on the outer layer by using the popular copper etching solution, i.e. poor in etching rate; tin layer is not acceptable when the fine pitch circuit should be formed.

Then, with reference to FIGS. 4 and 7, the etching properties among Examples 1 and 2 and Comparative Example 2 are compared. FIG. 7 shows an embodiment when copper etching solution is applied from direction demonstrated by the arrow to dissolve the cut section of the metal foil prepared in Comparative Example 2 having the three-layer structure of "tin layer/copper-tin alloy layer/copper foil layer". As is apparent in FIG. 7, the un-etched tin layer remains like a whisker projecting at the vicinity of the top portion of copper foil. Even if tin layer and copper foil layer are completely counter diffused to provide just the diffusion alloy layer, the diffusion alloy layer might be an inclined alloy composition layer having an alloy component content change along the thickness direction. So, the inclined alloy composition makes precious etching control difficult in the etching using the popular copper etching solution because etching rate changes along the thickness direction of the foil. In contrast, as the surface-treated copper-ally foils prepared in Examples 1 and 2 have a uniform alloy composition, even when the popular copper etching solution is applied from the cross-sectional direction to dissolve the cut section, the section will have a flat etching surface as shown in FIG. 4. So, it is apparent that the surface-treated copper-ally foils prepared in Examples 1 and 2 are suitable for the formation of the fine pitch circuit having an excellent etching factor because the surface-treated copper-ally foils prepared in Examples 1 and 2 enable the etching toward the thickness direction at a uniform etching rate.

As described above, when the surface-treated electro-deposited copper-alloy foil according to the present invention is used, excellent infrared laser processability and uniform etching rate along the thickness direction in the following etching process is achieved. In addition, the present invention enables the direct drilling of the surface-treated electro-deposited copper-alloy foil constituting the metal-clad laminate by using a carbon-dioxide laser, and does not require additional process for enhancing the infrared laser beam absorption efficiency including the black-oxide treatment and the auxiliary metal layer formation, and enables remarkable reduction of the total manufacturing cost through processes reduction.

What is claimed is:

1. An electro-deposited copper-alloy foil having a uniform alloy composition along a thickness direction and obtained from electrolyzing of an electrolytic solution, wherein the electro-deposited copper-alloy foil having the uniform alloy composition along the thickness direction is characterized in that tin content is 8% by mass to 25% by mass,
wherein the copper-alloy foil consists of copper and tin, and
wherein the copper-alloy foil has a thickness of 0.5 μm to 18 μm, wherein a grain in a crystal structure of the electro-deposited copper alloy foil is a columnar grain longitudinal along the thickness direction.

2. A surface treated electro-deposited copper-alloy foil having a uniform alloy composition along a thickness direction, wherein a surface of the electro-deposited copper-alloy foil having the uniform alloy composition along the thickness direction according to claim 1 is subjected to a surface-treatment at least one selected form a roughening treatment, a rust-proofing treatment, and a silane coupling agent treatment.

3. A metal-clad laminate obtained from laminating the surface-treated electro-deposited copper-alloy foil having the uniform alloy composition along the thickness direction according to claim 2 to a material constituting an insulating layer.

4. The electro-deposited copper-alloy foil having the uniform alloy composition along the thickness direction according to claim 1, wherein the electro-deposited copper-alloy foil having the uniform alloy composition along the thickness direction comprises a uniform alloy composition throughout the thickness direction of the electro-deposited copper-alloy.

5. An electro-deposited copper-alloy foil having a uniform alloy composition along a thickness direction provided with carrier foil comprising a layer structure of a carrier foil/a releasing layer/an electro-deposited copper-alloy foil,
wherein the electro-deposited copper-alloy foil having the uniform alloy composition along the thickness direction has a tin content of 8% by mass to 25% by mass,
wherein the copper-alloy foil consists of copper and tin, and
wherein the copper-alloy foil has a thickness of 0.5 μm to 18 μm.

6. The electro-deposited copper-alloy foil having the uniform alloy composition along the thickness direction provided with carrier foil according to claim 5, wherein a grain in a crystal structure of the electro-deposited copper-alloy foil is a columnar grain longitudinal along the thickness direction.

7. A surface treated electro-deposited copper-alloy foil having a uniform alloy composition along a thickness direction provided with a carrier foil, wherein a surface of the electro-deposited copper-alloy foil having the uniform alloy composition along the thickness direction according to claim 5 is subjected to a surface-treatment at least one selected from a roughening treatment, a rust-proofing treatment, and a silane coupling agent treatment.

8. A metal-clad laminate obtained from laminating the surface-treated electro-deposited copper-alloy foil having the uniform alloy composition along the thickness direction provided with a carrier foil according to claim 7 to an material constituting an insulating layer, and then releasing the carrier foil.

9. A surface treated electro-deposited copper-alloy foil having a uniform alloy composition along a thickness direction provided with a carrier foil, wherein a surface of the electro-deposited copper-alloy foil having the uniform alloy composition along the thickness direction according to claim 6 is subjected to a surface-treatment at least one selected from a roughening treatment, a rust-proofing treatment, and a silane coupling agent treatment.

10. A metal-clad laminate characterized in obtained from laminating of a surface-treated electro-deposited copper-alloy foil having the uniform alloy composition along the thickness direction provided with a carrier foil according to claim 9 to a material constituting an insulating layer, and then releasing the carrier foil.

11. An electro-deposited copper-alloy foil obtained from electrolyzing an electrolytic solution comprising copper and tin,
wherein the electrolysis of the electrolytic solution produces the electro-deposited copper-alloy foil,
wherein the electro-deposited copper-alloy foil has a tin content of 8% by mass to 25% by mass,
wherein the copper-alloy foil consists of copper and tin, and
wherein the copper-alloy foil has a thickness of 0.5 μm to 18 μm, wherein a grain in a crystal structure of the electro-deposited copper alloy foil is a columnar grain longitudinal along the thickness direction.

* * * * *